July 10, 1956  J. A. NORLING  2,753,774
STEREOSCOPIC CAMERA
Filed Feb. 12, 1953  2 Sheets-Sheet 1

INVENTOR
John A. Norling
BY
Pennie, Edmonds, Morton, Barrows and Taylor
ATTORNEYS

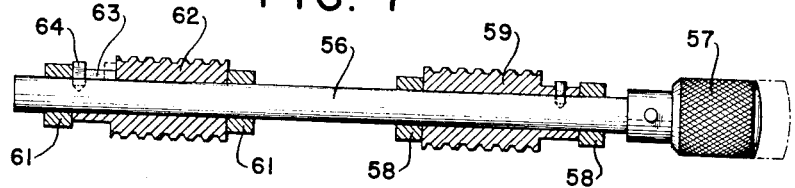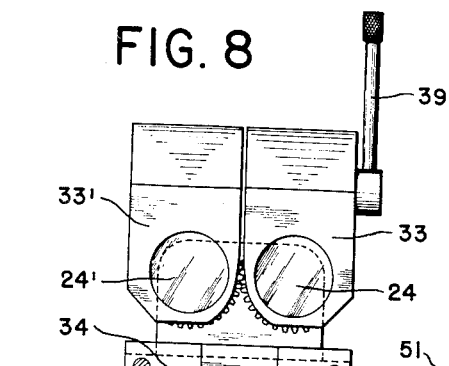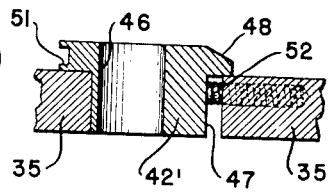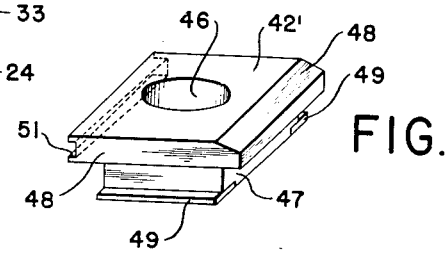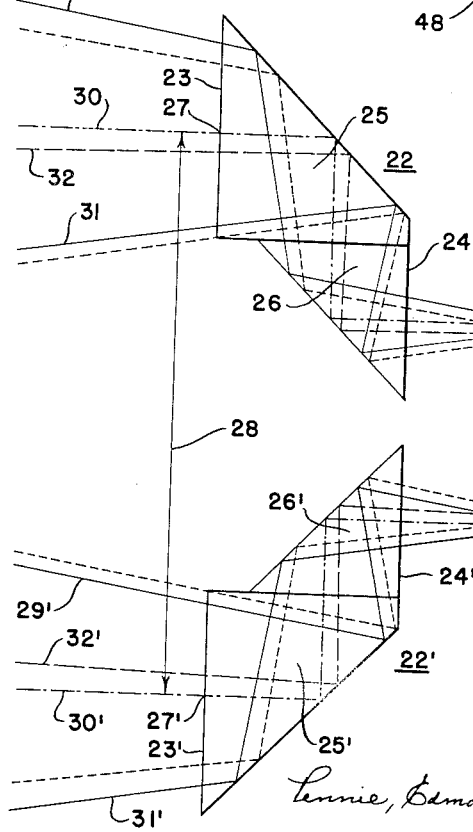

United States Patent Office 2,753,774
Patented July 10, 1956

2,753,774

STEREOSCOPIC CAMERA

John A. Norling, Scarsdale, N. Y.

Application February 12, 1953, Serial No. 336,553

3 Claims. (Cl. 95—18)

This invention relates to stereoscopic cameras, particularly to binocular cameras designed to produce stereoscopically related pairs of pictures of an object field on film.

Stereoscopic cameras having long been available for producing stereoscopically related pairs of pictures of an object field which, when properly viewed, exhibit the scene in three dimensions. Such cameras have commonly employed two matched lenses spaced apart horizontally which simultaneously photograph the object field from two points of view, and produce images on separate films or separate areas of a single film. When properly designed and operated, such cameras are capable of producing pictures which give an excellent sense of depth.

One important factor in obtaining properly related pairs of pictures is the interaxial separation or stereo base line from the extremes of which the pictures are taken. In a binocular camera employing two lenses without auxiliary optical elements, the stereo base line is the distance between the lens axes. Upon occasion optical elements such as mirrors have been employed to increase the base line. In these prior art proposals the base line has commonly been fixed, or substantially fixed, for a given camera. In some instances provision has been made for changing it, but the means employed have lacked simplicity and ease of adjustment.

The selection of a proper base line is important in order to secure pictures which, when viewed, exhibit realistic stereoscopic relief. Often the normal interocular separation of the eyes (about 2½ inches) is employed as a base line. This is satisfactory for objects which are no closer than about 10 feet, but is not satisfactory for closeups. A rough rule of thumb has been found to be that pictures should be taken only of objects farther than about 50 times the base line employed. Thus a 2½-inch base line would be satisfactory for objects 10 feet away or farther, but a base line of only 1¼ inches should be used for objects only 5 feet away. Upon occasion, base lines greater than the normal interocular distance is desirable to obtain special effects such as exaggeration of the apparent depth. Also, when the objects of greatest interest are considerably farther away than 10 feet, a larger base line is desirable.

It is a primary object of the present invention to provide a camera in which the stereo base line can be varied in a simple, convenient and effective manner so that pictures of objects at different distances can be taken in a manner to give realistic reproduction. It is a further object to provide such a system which will give a comparatively wide field of view while permitting the use of relatively short base lines.

A further factor highly important in a stereoscopic camera is the provision of means for varying the convergence of the picture axes. For distant objects satisfactory results may be obtained with the picture axes substantially parallel, that is, converging at infinity. However when taking pictures of nearby objects, and particularly closeups, it is important to converge the picture axes to obtain proper results. Ordinarily it is desirable to converge the picture axes somewhat in front of the nearest object of importance.

It is another principal object of the present invention to provide a structure which permits the picture axes to be converged in a simple and effective manner.

To facilitate the taking of pictures, it is desirable that the lens apertures be simultaneously adjustable to meet varying light conditions. In accordance with the present invention a simple mechanism for accomplishing this is provided which will function properly even though the lens separation is varied to change the convergence.

The importance of proper interaxial separation (base line) and proper convergence in obtaining satisfactory stereoscopic pictures has been presented at length in a series of articles which I have published in the Journal of the Photographic Society of America, Inc. for November and December, 1951, and January and February, 1952.

The present invention will be more fully understood by reference to the following description of a specific embodiment thereof taken in conjunction with the drawings in which:

Fig. 7 is a detail of a portion of the mechanism for adjusting the lens apertures;

Fig. 8 is a rear view of the prism arrangement of Fig. 3;

Fig. 9 is a detail of one lens slide mounting; taken along the line 9—9 in Fig. 6;

Fig. 10 is an isometric drawing of a lens slide; and

Fig. 11 is an optical diagram showing the functioning of the prisms and lenses.

Figure 1:
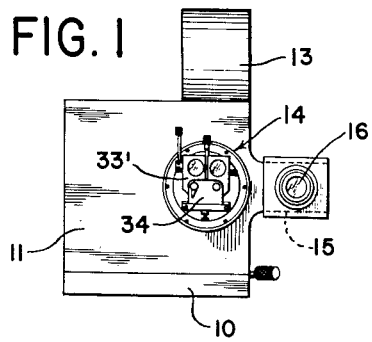
Fig. 1 is a front view of a stereoscopic camera in which the features of the present invention have been incorporated.
Figure 2:
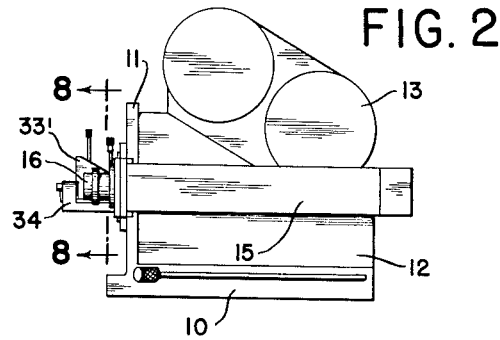
Fig. 2 is a side view of the camera of Fig. 1.

Referring now to Figs. 1 and 2, a stereoscopic motion picture camera is shown having a base plate 10 and front plate 11. A carriage 12 is provided which advantageously can be moved in a lateral direction for view finding. Carriage 12 contains the film-feeding mechanisms and carries film-reel housing 13 in which two rolls of film and corresponding takeup spools are mounted. On the front of the camera is an optical system 14 described in detail hereinafter. A view finder 15 is mounted on carriage 12, and in the taking position cooperates with lens 16 mounted in front plate 11 so as to permit the operator to follow the action. Advantageously this is a binocular view finder and provision is made so that when the carriage 12 is moved laterally, the view finder lies behind the optical system 14. In this manner an operator can see the scene to be photographed through the optical system used in taking the pictures, and can make suitable adjustments of base line and convergence.

The principles of operation of the apparatus of the invention will best be understood by reference to Fig. 11. In this figure portions of two motion picture films 17, 17' are shown immediately behind a mask 18 having apertures which define a pair of horizontally separated similar picture areas 19, 19'. In order to allow a minimum base line to be employed for closeups, the films and mask apertures are placed as close together as practicable. In a camera which has been operated with success 35 mm.

motion picture film is employed and the two films spaced part approximately ⅛ inch. The centers of the corresponding picture areas are hence separated approximately 1½ inches in the horizontal direction. This arrangement allows a minimum base line of approximately 1½ inches to be employed, as will be shown hereinafter. Suitable means for feeding the film is provided but not shown in the drawing.

In front of the picture areas are positioned matched lenses 21, 21'. In front of the lenses are positioned respective prism assemblies 22, 22'. Prism assembly 22 has a front face 23 and a rear face 24, and is so designed that corresponding entrance and exit light rays are parallel. In the structure shown, two right-angle prisms 25 and 26 are employed, prism 25 being larger for a reason to be described later. Prism assembly 22' is similar. As is apparent from the paths of rays of light, in each prism assembly the rays are reflected twice in passing therethrough.

With the lenses 21, 21' in the positions shown in full lines, the convergence of the picture axes is at infinity. The axes of the two lenses are parallel and aligned with the centers of the picture areas 19, 19' as shown by the dot-dash lines 30, 30'. Under this condition the interaxial spacing of the lenses is the same as that of the picture areas, or approximately 1½ inches in one specific construction.

Lines 30, 30' also represent axial rays of light passing through respective lenses to respective films. As is apparent from the drawing, these rays of light enter the front faces of the respective prisms at points 27, 27'. The rays entering the front faces are parallel, which is the condition for convergence at infinity. It will be noted however that the separation of points 27, 27' is considerably greater than that of the lenses, and hence the effective base line from which the two pictures are taken is represented by line 28. Full lines 29, 31 and 29', 31' represent rays from the extremes of the object field which impinge on the boundaries of the picture areas. As will be explained in connection with Figs. 3 and 4, prism assemblies 22, 22' may be rotated to bring faces 23, 23' closer together, and hence reduce the base line. This may be accomplished without in any way altering the position of the lenses 21, 21', and without in any way impairing the quality of the pictures taken.

The dotted positions of lenses 21, 21' illustrate an adjustment for converging on nearby objects. In this case the lenses are closer together and the picture axes represented by lines 32, 32' converge in the object field. It will be noted that this convergence can be obtained by simply moving the lenses 21, 21' closer together in the horizontal direction without in any way changing the position of the prism assemblies. Thus the base line and convergence may be adjusted independently.

As above mentioned, prism 25 is larger than prism 26. The purpose of this is to obtain a wide field of view, while still permitting a minimum base line to be attained. The maximum size of the exit faces 24, 24' of the prism assemblies is determined by their physical separation, and it is desirable to reduce this separation to a minimum in order to obtain a short base line. However, by making prism 25 larger than 26, the boundary rays 29, 31 from the object field subtend a much wider angle than would otherwise be possible. While this wide angle feature is considered important, prisms 25, 26 could be made the same size and, in this event, could be replaced by a rhombic prism.

Figure 3:
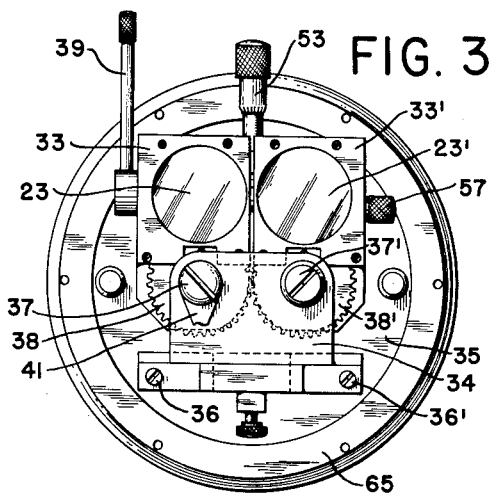
Fig. 3 is a front view of the prism arrangement which provides a variable base line, adjusted for minimum base line.
Figure 4:
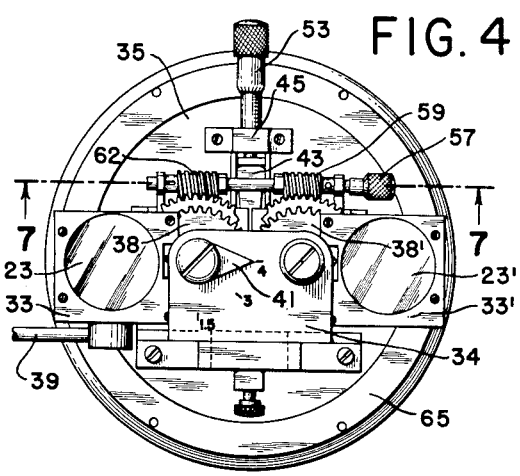
Fig. 4 is a view of the prism arrangement adjusted for maximum base line.

Referring now to Figs. 3 and 8, the mechanism for housing the prisms and rotating them to vary the base line is shown. Fig. 3 shows the prisms adjusted for minimum base line and Fig. 4 for maximum. The prism assembly 22 is contained in housing 33 and prism assembly 22' in housing 33'.

Prism housings 33, 33' are rotatably mounted on a support member here shown as a bracket 34 attached to face plate 35 by means of screws 36, 36'. The axes of rotation 37, 37' coincide with the centers of the respective picture areas 19, 19' (Fig. 11), and the front faces 23, 23' and rear faces 24, 24' are perpendicular to the respective axes of rotation. Advantageously the axes of rotation pass through the centers of the rear faces 24, 24'. Thus the prisms can be rotated outwardly from the position shown in Fig. 3 to that shown in Fig. 4 without in any way displacing the centers of the images or introducing distortion therein. Simultaneous movement of the prism housings is obtained by providing gear sections 38, 38' on the respective housings, intermeshed so that movement of prism housing 33 by means of handle 39 will simultaneously move housing 33' in the opposite direction.

A pointer 41 is provided on the axle of prism housing 33 and cooperates with a scale on bracket 34 to indicate the base line. In the embodiment specifically illustrated the base line is continuously variable from about 1.5 inches to 4 inches. The maximum base line is determined by the degree of offset of front faces 23, 23' with respect to rear faces 24, 24' (Fig. 11), and can be changed to meet the expected operating requirements.

Figure 5:
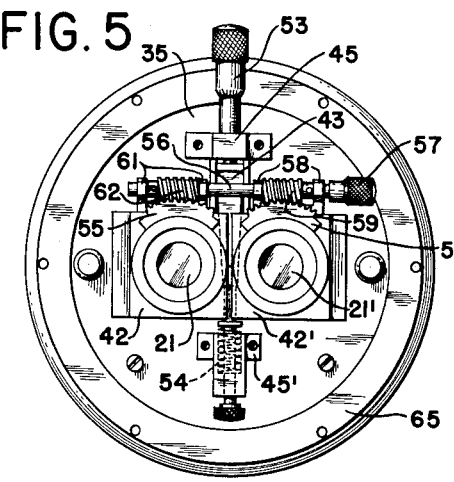
Fig. 5 is a view of the lenses behind the prism arrangement, showing the mechanism for obtaining variable convergence in the position for convergence at a near plane.
Figure 6:
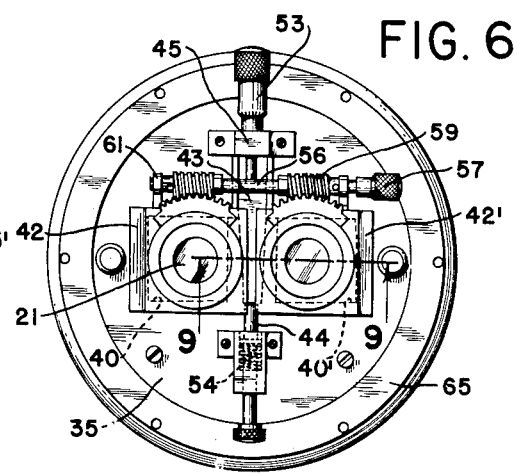
Fig. 6 is a view similar to Fig. 5 with the mechanism adjusted for convergence at a far plane.

Referring now to Figs. 5 and 6, apparatus for providing continuous adjustment of the convergence is shown. In these views the prism assembly shown in Figs. 3 and 4 has been removed to show the lens arrangement immediately behind. When assembled, lens 21 is behind prism rear face 24, and lens 21' behind rear face 24', as illustrated in Fig. 11.

Lenses 21, 21' are held in respective slides 42, 42' which are mounted for horizontal movement in openings 40, 40' base plate 35. The openings in the base plate are sufficiently large so as not to obstruct light passing through the lenses at any position of adjustment. A wedge 43 unitary with a rod 44 is carried by brackets 45, 45' attached to the base plate 35, and is movable therein in the vertical direction. Wedge 43 engages the inner edges of slides 42, 42' so that its vertical position determines the horizontal separation of the slides, and hence the horizontal separation of the lenses. Springs are provided to bias the slides toward the wedge.

Fig. 10 is a view of one slide 42' having a hole 46 therein in which the lens 21' is mounted. The lower portion 47 of the slide is set back from the upper portion 48 on all sides so that upper portion 48 can rest flat against the face plate 35 (Fig. 5) and exclude light. The lower portion 47 is dimensioned to fit into the corresponding opening 40' in the face plate and, when inserted, is held in place by removable strips 49. A slot 51 is provided to receive the wedge 43, and is tapered to conform with the wedge and allow smooth engagement therewith.

Fig. 9 shows the slide 42' in position in the corresponding opening in base plate 35. A compressional spring 52 is provided to press slide 42' inwardly into engagement with wedge 43 (Fig. 5) which rides in slot 51.

Referring back to Fig. 5, the vertical position of wedge 43 is adjusted by means of a micrometer screw 53 which bears against the top of the wedge. A compressional spring 54 is provided at the bottom of rod 44 to hold the wedge tightly against the micrometer screw. In this manner a very precise and reproducible separation of the lenses can be obtained.

Each lens 21, 21' is provided with an adjustable diaphragm which may be, for example, of the iris or other well known type. The opening of each diaphragm may be set by a rotatable ring 55, 55', each having a gear section. The construction of each diaphragm may follow conventional practice.

In order to permit the simultaneous adjustment of both diaphragms, a rod 56 is provided having a knurled knob 57. Dealing first with diaphragm 55', the slide 42', is provided with projecting ears 58 through which rod 56 passes, and a worm gear 59 is mounted on the rod between the ears 58, and pinned to the rod. This construction is shown in detail in Fig. 7. Worm gear 59 engages the gear sector of diaphragh 55' so that rotation of the knob 57 rotates the diaphragm ring and hence determines the diaphragm opening of lens 21'.

Slide 42 is similarly provided with ears 61 through which rod 56 likewise passes. Between the ears is positioned a worm gear 62 in engagement with the gear section of diaphragm 55. Unlike worm gear 59, gear 62 is provided with a longitudinally extending slot 63, and a pin 64 affixed to the rod 56 travels in slot 63. As rod 56 is rotated by the knurled knob, pin 64 causes worm gear 62 also to rotate and the worm gear is held between ears 61 so as to prevent lateral movement with respect to slide 42. Consequently the rotation of worm gear 62 causes the rotation of diaphragm 55 and determines the opening of lens 21.

The purpose of the pin and slot connection 63 64 is to allow relative movement of slides 42, 42' for adjusting convergence, without altering the setting of the diaphragm openings. In Figs. 5 and 7, the position of the slot connection is shown for minimum separation of the slides. If the slides are forced apart as shown in Fig. 6, the rod 56 moves with slide 42'. Ears 61 on slide 42 move outward, carrying worm gear 62 along with them, and the pin and slot connection allows movement of the gear 62 along the rod 56 without rotation thereof. Consequently the diaphragm settings for lenses 21, 21' remain unchanged.

In order to allow focusing of the camera, the outer periphery of face plate 35 is in threaded engagement with ring 65. Ring 65 is rotatably mounted on the camera front plate 11 so that by turning the ring, the face plate is moved forward and backward. The face plate carries the lenses 21, 21' along with it and hence the distance from the lenses to the films may be adjusted.

In operation, the camera may be pointed toward the desired object field and the carriage 12 moved laterally until the view finder 15 lies behind lenses 21, 21'. In this position the operator may focus the camera by rotating ring 65, select the desired base line by means of lever 39, and adjust the convergence by means of the micrometer screw adjustment 53. He also may adjust the lens apertures by rotating knurled knob 57. After the desired adjustments have been made, the camera is moved back to the position shown in Fig. 1 so that the films and picture mask lie behind the lenses as illustrated in Fig. 11. In this position the view finder 15 is aligned with an auxiliary view finding lens 16 so that the operator can watch the field while exposures are being made. Of course, if desired the base line and convergence may be adjusted without using the binocular viewer, and provision for lateral movement of the camera carriage eliminated.

It will be apparent that the camera of the present invention has features which enable the taking of stereoscopic pictures in a simple and expeditious manner, and provides for quick and easy adjustment of the various factors involved in obtaining good pictures under widely different conditions. The mechanisms are simple and effective, and have been found to give excellent results in practice. While shown in connection with a motion picture camera, the features may be incorporated in still cameras also.

It will be apparent to those skilled in the art that details of the specific embodiment described herein may be altered without departing from the spirit and scope of the invention, and that certain features of the invention may be omitted while retaining others depending upon the use to which the camera is to be put.

I claim:

1. A stereoscopic camera which comprises means defining a pair of horizontally-separated similar picture areas, a support member in front of said picture areas, a pair of housings containing respective prism means each having offset front and rear faces, said housings being rotatably mounted on said support member about respective axes fixed with respect to said support member and substantially aligned with the centers of said picture areas, means coupling said prism housings for simultaneous inward and outward rotation thereof, a pair of lenses carried by respective slides mounted on said support member with the lenses between respective rear faces of said prism means and said picture areas for forming respective stereoscopically-related images of an object field substantially at said picture areas, said slides being slidable in the horizontal direction, means mounted on said support member for moving said slides simultaneously in opposite directions to thereby vary the convergence of the picture axes without changing the focussing of the lenses, adjustable diaphragms for said lenses respectively having rotatable gear portions for controlling the openings thereof, a shaft rotatably mounted in said slides and bearing a pair of worm gears engaging the gear portions of said diaphragms respectively to adjust simultaneously the diaphragm openings, at least one of said worm gears having at least limited freedom of movement along said shaft but being restrained from rotation thereabout, said one worm gear being restrained from movement along its axis relative to the correspond slide.

2. A stereoscopic camera which comprises means defining a pair of horizontally-separated similar picture areas, a support member in front of said picture areas, a pair of housings containing respective prism means each having offset front and rear faces, said housings being rotatably mounted on said support member about respective axes fixed with respect to said support member substantially aligned with the centers of said picture areas, means coupling said prism housings for simultaneous inward and outward rotation thereof, a pair of lenses carried by respective slides mounted on said support member with the lenses between respective rear faces of said prism means and said picture areas for forming respective stereoscopically-related images of an object field substantially at said picture areas, said slides being slidable in the horizontal direction, means mounted on said support member for moving said slides simultaneously in opposite directions to thereby vary the convergence of the picture axes without changing the focussing of the lenses, adjustable diaphragms for said lenses respectively having rotatable gear portions for controlling the openings thereof, a shaft rotatably mounted in pairs of projections of said slides and bearing a worm gear between each pair of projections, said worm gears meshing with the gear portions of said diaphragms respectively to adjust simultaneously the diaphragm openings, said shaft and one of said worm gears being mounted for unitary rotation in the corresponding pair of projections and restrained from axial movement with respect thereto, said shaft being slidable in the other pair of projections and the other of said worm gears being slidable along the shaft but restrained from rotation relative thereto, said other worm gear being restrained from movement in the axial direction relative to the corresponding slide.

3. A stereoscopic camera which comprises means defining a pair of horizontally-separated similar picture areas, a support member in front of said picture areas, a pair of housings containing respective prism means each having offset front and rear faces, said housings being rotatably mounted on said support member about respective axes fixed with respect to said support member and substantially aligned with the centers of said picture areas, means coupling said prism housings for simultaneous inward and outward rotation thereof, a pair of lenses carried by respective slides mounted on said support member with the lenses between respective rear faces of said prism means and said picture areas for forming respective stereoscopically-related images of an object field substantially at said picture areas, said slides being slidable in the horizontal direction, means mounted on said support member for moving said slides simultaneously in opposite directions to thereby vary the convergence of the picture axes without changing the focussing of the lenses, adjustable diaphragms for said lenses respectively having rotatable gear portions for controlling the openings thereof, a shaft rotatably mounted in pairs of projecting ears of said slides, a pair of worm gears mounted on said shaft between respective pairs of ears and restrained thereby from movement in the axial direction relative to the respective slides, one of said worm gears being affixed to said shaft and the other connected thereto by a pin and slot coupling allowing movement along the shaft but preventing rotation relative thereto.

References Cited in the file of this patent

UNITED STATES PATENTS

| | | |
|---|---|---|
| 862,354 | Stevens | Aug. 6, 1907 |
| 2,453,693 | Armstrong | Nov. 16, 1948 |
| 2,601,086 | Bucky | June 17, 1952 |

FOREIGN PATENTS

| | | |
|---|---|---|
| 889,733 | France | Oct. 11, 1943 |
| 456,501 | Italy | Apr. 12, 1950 |